United States Patent
O'Brien

[11] 4,085,061
[45] Apr. 18, 1978

[54] TRITIATED WATER TREATMENT PROCESS

[75] Inventor: Charles J. O'Brien, Citrus Heights, Calif.

[73] Assignee: Aerojet-General Corporation, El Monte, Calif.

[21] Appl. No.: 708,793

[22] Filed: Jul. 26, 1976

Related U.S. Application Data

[63] Continuation of Ser. No. 521,755, Nov. 7, 1974, abandoned.

[51] Int. Cl.² .......................... G21F 9/12; B01D 59/00
[52] U.S. Cl. .......................... 252/301.1 W; 210/30 R; 423/648 A
[58] Field of Search ................ 252/301.1 W, 301.1 R; 423/648; 210/30 R

[56] References Cited

U.S. PATENT DOCUMENTS

| 2,780,526 | 2/1957 | Fleck | 423/648 |
| 3,560,158 | 2/1971 | Benson | 250/304 |

Primary Examiner—Benjamin R. Padgett
Assistant Examiner—Deborah L. Kyle
Attorney, Agent, or Firm—John S. Bell

[57] ABSTRACT

A chemical exchange method for removing tritium from nuclear reactor cooling water is described herein. A concentrated tritium distribution is formed by transfering tritium from the reactor cooling water to a weakly basic, hydrophilic solid, and then to a more strongly basic liquid. Tritium is then removed from the more strongly basic liquid by distillation.

9 Claims, 1 Drawing Figure

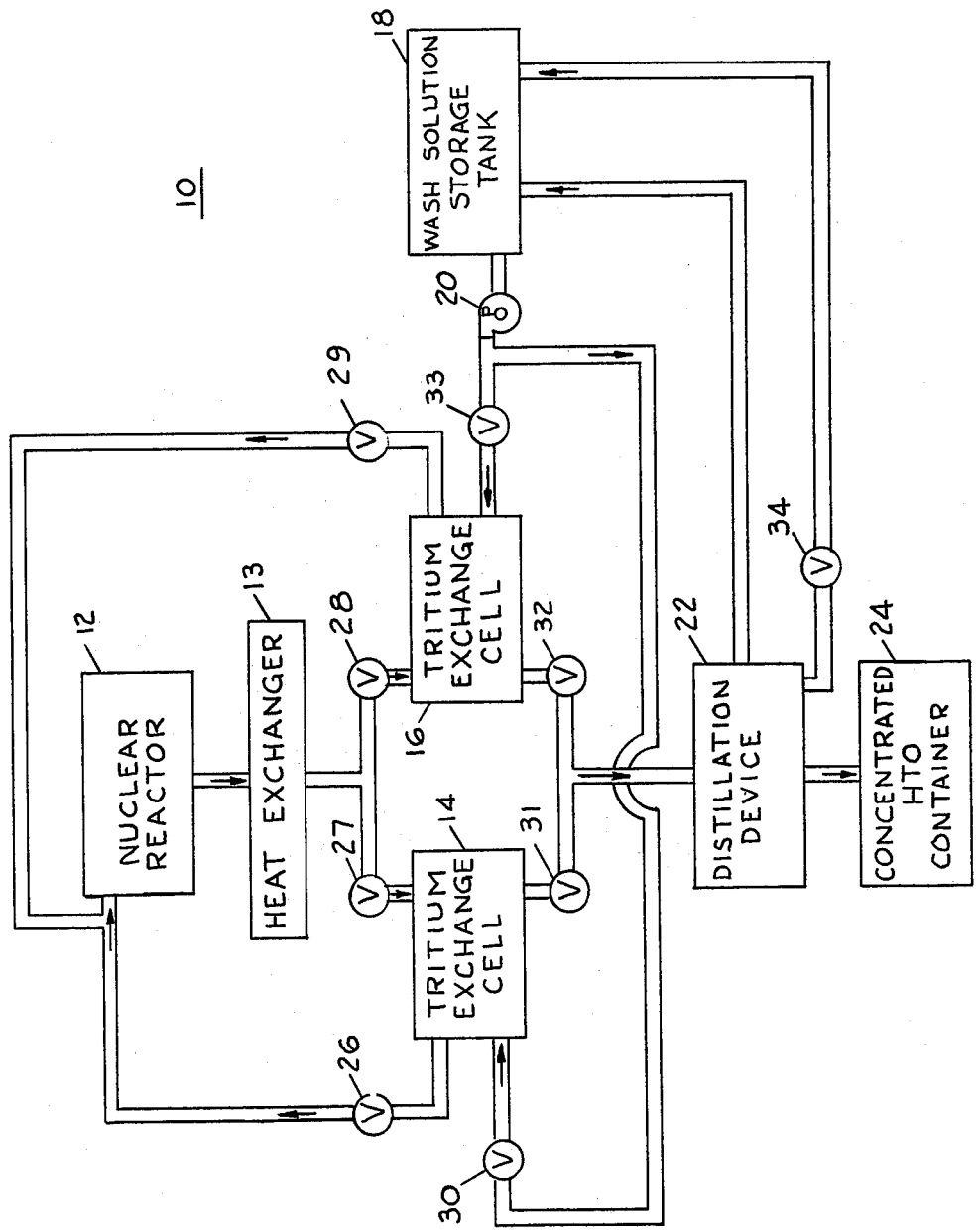

TRITIATED WATER TREATMENT PROCESS

This is a continuation of application Ser. No. 521,755, filed Nov. 7, 1974 now abandoned.

BACKGROUND OF THE INVENTION

1. Field of the Invention

The handling of radioactive wastes, and more specifically the removal and concentration of radioactive tritium from the water used to cool a nuclear reactor.

2. Brief Description of the Prior Art

Tritium is a radioactive isotope of hydrogen. A small quantity of the water used to cool nuclear reactors is converted by radiation to tritiated water, i.e., HTO and $T_2O$. It is desirable to remove the tritiated water from the normal water so that it can be either safely stored until its radioactivity decays, or effectively utilized for purposes such as fusion power. But, tritiated water is chemically and physically similar to normal water, and mixed with such a large quantity of normal water in a reactor cooling system, that excessive quantities of reactant material and/or energy are required to separate the tritium according to all prior art methods. Typical reactors now being designed and built have closed loop water cooling systems holding more than 97,000 gallons of water. A distribution of only 0.057 grams of tritium in that 97,000 gallons of cooling water will provide a potentially dangerous 550 Ci radiation level, and should be removed.

It is well known that tritium interacts chemically with many other materials, and it has been suggested to remove tritium from reactor cooling water by chemical interaction. More specifically, it has been suggested to react the cooling water with calcium carbid to produce tritiated acetylene which can be readily polymerized into a low volume solid. But, calcium carbide also reacts with normal water to produce normal acetylene. That method would therefore require impractically large quantities of calcium carbide and primarily convert normal water into polyacetylene. Approximately 1.4 million pounds of calcium carbide would be needed for just a single treatment of a 97,000 gallon cooling system.

It has also been suggested to remove tritium from reactor cooling water by first electrolyzing the water to separate oxygen, then separating the bulk of hydrogen from tritium by a substance such as vanadium hydride, and finally reacting the tritium and hydrogen with zirconium or other tritium-fixing material to form a low volume tritiated solid. The primary drawback of this process is that excessive energy would be required to electrolyze the large quantity of cooling water in present reactors.

SUMMARY OF THE INVENTION

This invention is a method and apparatus for removing and concentrating tritium from the cooling water of a nuclear reactor without using excessive material or energy. Tritium is first transferred from the reactor cooling water to a more concentrated distribution, and then removed from that more concentrated distribution.

The system illustrated herein provides a concentrated tritium distribution by a two-step transfer process in which each step comprises contacting a more strongly basic, labile, hydrogen-containing material. But, any number of transfer steps using one or more materials with different affinities for tritium could be used. Tritium will transfer to any material that contains labile hydrogen atoms. Materials that have high pH values have a greater affinity for tritium and will thus support higher tritium concentrations than those that have lower pH values, or in other words are less strongly basic. The two-step transfer process described herein, transfers tritium from the reactor water to an intermediate solid, and then to a more strongly basic liquid. This provides good tritium concentration. And, the concentrated tritium distribution can be efficiently and conveniently removed from a liquid medium by processes such as distillation without requiring excessive energy.

The system illustrated herein includes two exchange cells or containers holding material somewhat more basic than the reactor water. Those cells are interconnected with the reactor cooling system such that either one cell can be used to remove tritium from the reactor cooling water, while tritium buildup is being removed from the other by washing with a more strongly basic liquid. The exchange cells are also interconnected to distillation apparatus for removing tritium from the wash liquid. This interconnection provides convenient recycling and reuse of the wash liquid.

BRIEF DESCRIPTION OF THE DRAWING

Further objects, features, and advantages of this invention, which is defined by the appended claims, will become apparent from a consideration of the following description of the accompanying FIGURE, which is a schematic diagram showing one embodiment of the system of this invention for removing tritium from nuclear reactor cooling water.

DETAILED DESCRIPTION OF THE DRAWING

The FIGURE shows a system 10 for removing tritium from water used to cool a nuclear reactor 12. The flow of cooling water through reactor 12 is closed-loop, and water is recirculated from system 10 back through reactor 12. The tritium removal system 10 includes a heat exchanger 13 to condense any steam present, and exchange cells 14 and 16 for extracting tritium from the cooling water cooling reactor 12. The exchange cells are containers for holding a material that has a greater affinity for tritium than that of the reactor cooling water. The system 10 also includes tank 18 for holding a wash liquid that has a still greater affinity for tritium and will therefore remove tritium from cells 14 and 16; a pump 20 for pumping the wash liquid through the system; distillation apparatus 22 for separating tritium from the wash liquid; and a container 24 for receiving concentrated tritium from distillation apparatus 22. Valves 26, 27, 28 and 29 are disposed to control flow of reactor cooling water through the system 10; valves 30, 31, 32 and 33 are disposed to control flow of the wash liquid; and a valve 34 is disposed to control gravity flow of the concentrated wash solution residue from distillation back to the storage tank 18.

Any number of different materials can be used in the exchange cells 14 and 16, and for the wash liquid. During development and testing of this invention, materials containing substituent alcohol (—OH), acid (—COOH), acetone (—C═O),

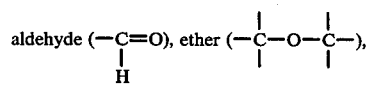

and amine (—NH$_2$) groups were used to remove tritium from reactor cooling water with positive results. Cellulosic materials, such as cotton and wood which contain both the alcohol and ether groups, and protein-like materials, such as muscle tissue which contains both ketone and amine groups, provided the best results. These materials are all more basic than the reactor cooling water, and therefore extract tritium from the water.

The tritium extracted by these materials is then best removed therefrom by a very strongly basic wash liquid.

Operation of system 10 will be explained with cotton used in cells 14 and 16 to extract tritium from the reactor cooling water, and a 3N sodium hydroxide solution used as the wash liquid. These materials are selected for example only. But they are a good combination because they are compatible with each other, plentiful, inexpensive, and easy to handle. The sodium hydroxide solution has a pH value of 14, and the cotton is compatible with water, can be easily held in an exchange container, and is fibrous and therefore presents a large surface area to cooling water.

In operation, with valves 26, 27, 32 and 33 open, and 28, 29, 30 and 31 closed, pumps associated with the reactor cooling system (not shown) cause water to flow through exchange cell 14 and transfer tritium to the cotton or other tritium-absorbing material in that cell. And, the sodium hydroxide wash solution is pumped by pump 20 from tank 18 through cell 16 to remove tritium from the material therein. The pH values of the cotton and sodium hydroxide solution with respect to that of the reactor cooling water, which is slightly acidic, cause a tritium distribution that is substantially more concentrated than that in the reactor cooling water to be formed in the sodium hydroxide wash solution. Backwashing with a Na OH wash solution one one-thousandth the volume of the reactor cooling water provides a tritium concentration 35 times greater than that in the reactor cooling water.

Distillation device 22 then separates the majority of the normal water, which vaporizes at 100° C at one atmosphere pressure from tritiated water, which vaporizes at 101.5° C at one atmosphere pressure utilizing only one one-thousandth the energy that would be required for removal directly from the reactor cooling water. The ordinary water vapor flows to tank 18, and the tritiated water vapor flows to container 24. Liquid sodium hydroxide residue from the distillation is transferred by gravity flow through control valve 34 to tank 18, where it recombines with distilled water to again form wash solution that is subsequently used to remove tritium from the material in cells 14 and 16. When sufficient tritium buildup and removal have been accomplished in cells 14 and 16, respectively, the valves are reset so that cell 14 is washed and cell 16 is used for removal of tritium from the reactor cooling water.

Having thus described one embodiment and operating mode of this invention, a number of modifications will occur to those skilled in this art.

Therefore, what is claimed is:

1. A method for removing tritium from water comprising the steps of:
   bringing the water into contact with a water insoluble hydrophilic material that is more basic than the water and contains labile hydrogen atoms to provide an isotope exchange of tritium from the water to said water insoluble material;
   bringing said water insoluble hydrophilic material into contact with a liquid that contains labile hydrogen atoms and is more basic than said water insoluble material to provide an isotope exchange of tritium from said water insoluble material to said liquid, said more basic property of said liquid causing a tritium concentration to form in said liquid that is greater than the tritium concentration in the water; and
   separating the tritium from said liquid.

2. The method of claim 1 in which said isotope exchange of tritium from the water to a water insoluble material comprises an exchange to a material having either an —OH alcohol, —COOH acid, —C=O ketone,

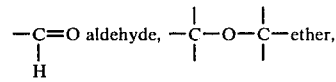

or —NH₂ amine constituent.

3. The method of claim 2 in which said exchange of tritium to a water insoluble material comprises an exchange to either a cellulosic or a protein material.

4. The method of claim 3 in which said step of bringing said hydrophilic material into contact with a liquid comprises washing said hydrophilic material with a sodium hydroxide solution.

5. The method of claim 4 wherein said method is utilized to remove tritium from a nuclear reactor cooling water system.

6. A system for removing tritium from water comprising:
   means for bringing the water into contact with a water insoluble hydrophilic material that is more basic than the water and contains labile hydrogen atoms to provide an isotope exchange of tritium from said water to said water insoluble material;
   means for bringing said water insoluble hydrophilic material into contact with a liquid that contains labile hydrogen atoms and is more basic than said water insoluble material to provide an isotope exchange of tritium from said water insoluble material to said liquid, said more basic property of said liquid causing a tritium concentration to form in said liquid that is greater than the tritium concentration in the water; and
   means for separating the tritium from said liquid.

7. The system of claim 6 in which said means for bringing the water into contact with said water insoluble material include:
   exchange cell means for containing a water insoluble material having labile hydrogen atoms; and
   conduit means defining a closed loop flow path for recirculation of tritiated water through said exchange cell means.

8. The system of claim 7 further including:
   second exchange cell means for containing a second quantity of a water soluble material having labile hydrogen atoms; and
   second conduit means defining a closed loop flow path for recirculation of tritiated water through said second exchange cell means;
   means for bringing said more basic liquid into contact with said water insoluble material in said second exchange means; and
   valve means for interrupting the flows of water and said more basic liquid to said first and second exchange cell means to thereby permit water to be supplied to each one of said exchange cell means for isotope exchange of tritium to said water insoluble material during simultaneous flow of said more basic liquid to the other of said exchange cell means for isotope exchange of tritium from the water insoluble material to said liquid.

9. The system of claim 7 further including means for recovering at least a portion of said more basic liquid from said separating means for reuse in removal of additional tritium from said water insoluble material in said exchange cell means.

* * * * *